(12) United States Patent
Yaunke et al.

(10) Patent No.: US 9,051,715 B2
(45) Date of Patent: Jun. 9, 2015

(54) CROWD MACHINERY GUARD FOR MINING SHOVEL

(71) Applicant: Caterpillar Global Mining LLC, Oak Creek, WI (US)

(72) Inventors: Jeanne Yaunke, Delavan, WI (US); Andrew Freres, Racine, WI (US); Neil Doll, Madison, WI (US); Jonathan Vitas, Waukesha, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 408 days.

(21) Appl. No.: 13/668,823

(22) Filed: Nov. 5, 2012

(65) Prior Publication Data

US 2014/0126985 A1 May 8, 2014

(51) Int. Cl.
*E02F 3/30* (2006.01)
*B60R 19/26* (2006.01)
*B60R 19/28* (2006.01)
*B60R 19/30* (2006.01)
*B60R 19/32* (2006.01)

(52) U.S. Cl.
CPC .................. *E02F 3/308* (2013.01); *B60R 19/26* (2013.01); *B60R 19/28* (2013.01); *B60R 19/30* (2013.01); *B60R 19/32* (2013.01)

(58) Field of Classification Search
CPC ...... B60R 19/26; B60R 19/28; B60R 19/285; B60R 19/30; B60R 19/32; B60R 19/36; E02F 3/308; E02F 3/46; E02F 3/58

USPC ............ 37/394, 397; 293/132, 134, 135, 136, 293/137; 414/694, 719
See application file for complete search history.

(56) References Cited

U.S. PATENT DOCUMENTS

| | | | | |
|---|---|---|---|---|
| 2,059,660 | A | * | 11/1936 | Sheets ........................... 414/682 |
| 2,722,325 | A | | 11/1955 | Dempster |
| 4,085,854 | A | * | 4/1978 | Baron ........................... 414/694 |
| 4,464,093 | A | | 8/1984 | Baron et al. |
| 5,499,463 | A | * | 3/1996 | Profio et al. ..................... 37/398 |
| 7,950,171 | B2 | * | 5/2011 | Wurster .......................... 37/397 |
| 2007/0107269 | A1 | * | 5/2007 | Hren et al. ....................... 37/398 |
| 2010/0212194 | A1 | * | 8/2010 | Hren et al. ....................... 37/445 |
| 2011/0146114 | A1 | * | 6/2011 | Hren et al. ....................... 37/445 |
| 2012/0101693 | A1 | * | 4/2012 | Taylor ............................. 701/50 |
| 2012/0195728 | A1 | * | 8/2012 | Stalker et al. .................. 414/685 |
| 2012/0195729 | A1 | * | 8/2012 | Hren et al. ..................... 414/687 |
| 2013/0259626 | A1 | * | 10/2013 | Larson et al. .................. 414/719 |
| 2014/0219763 | A1 | * | 8/2014 | Bienfang et al. .............. 414/719 |

* cited by examiner

*Primary Examiner* — Saul Rodriguez
*Assistant Examiner* — Brendan Tighe
(74) *Attorney, Agent, or Firm* — Foley & Lardner LLP (57) ABSTRACT

A crowd machinery guard system for a mining shovel is provided. The crowd machinery guard system includes a mounting bracket assembly coupled to the front of the mining shovel frame. The crowd machinery guard system also includes at least one support leg rotatably coupled to the mounting bracket assembly, and an impact plate assembly coupled to the support leg. The impact plate assembly includes an impact plate configured to receive dipper impacts, at least one support leg bracket coupled to the impact plate, and at least one cushion subassembly including a dampening portion. The crowd machinery guard system is configured to absorb and distribute the force of dipper impacts.

15 Claims, 10 Drawing Sheets

CROWD MACHINERY GUARD FOR MINING SHOVEL

TECHNICAL FIELD

This disclosure relates to an impact guard for mining shovels, and particularly to an impact guard to protect the shovel against impact from the dipper structure.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Typical power shovels or excavators use a bucket or dipper assembly to scoop earth or other material from horizontal or vertical faces. These conventional power shovels have a fixed boom, and the dipper assembly is mounted on the boom via a crowd mechanism. The fixed boom extends upwardly and outwardly from the frame. The crowd mechanism includes two crowd sheaves and a saddle block on the boom, and half sheaves on both ends of the dipper handle. Two ropes are connected about the sheaves and are used to move the dipper handle translationally with respect to the saddle block. Once the dipper is filled with material, the dipper is moved to a deposit point to unload the material.

After the unloading sequence, the dipper often swings backwards, coming into contact with the boom and the crowd machinery, and causing damage to both. Conventional mining shovels have utilized bumpers (i.e., rubber pads or cushions) to protect the mining shovel from the impact of the dipper. These bumpers have generally been small devices mounted on the lower front end of the boom of the mining shovel. An example of such a bumper is found in U.S. Pat. No. 4,464,093 issued Aug. 7, 1984, for "Power Shovel Having Improed (sic) Hoist System."

Conventional bumpers are generally adapted to engage the dipper when it is being retracted and to cushion the impact of its motion. Conventional bumpers may also be used to protect the crowd machinery from the mining environment, including bad weather and small impacts (i.e. rocks kicked up from a vehicle tire or debris spilling out of the dipper). However, conventional bumpers are often used to protect the boom structure, and may not fully protect the crowd machinery. For instance, conventional bumpers are typically not designed to prevent damage when the crowd machinery receives a heavy impact (i.e. impacts from dipper components, large boulders, or other mining trucks), or when the crowd machinery receives an impact at an uncommon angle.

Further, conventional bumpers are insufficient to protect the crowd machinery from dipper impacts in mining applications where blasting may be less successful, such as in some iron ore mines. In these types of applications, the dipper may be filled with large rocky materials, which can cause the dipper door to stick in the open position. When the dipper door is stuck in the open position and filled with rocky material, the dipper can strike the crowd mechanism with an inordinate amount of force or at an uncommon angle. Conventional bumpers are unable to more completely protect the crowd mechanism from these types of dipper impacts.

SUMMARY

An embodiment of the present disclosure relates to a crowd machinery guard system for a mining shovel. The crowd machinery guard system includes a mounting bracket assembly coupled to the front of the mining shovel frame, at least one support leg rotatably coupled to the mounting bracket assembly, and an impact plate assembly coupled to the support leg and disposed adjacent to the crowd machinery.

In this embodiment, the impact plate assembly includes an impact plate configured to receive impacts from a dipper assembly, at least one support leg bracket coupled to the impact plate and configured to receive the support leg, and at least one cushion subassembly coupled to the impact plate, the cushion subassembly including a dampening portion. The crowd machinery guard system is configured to move between a first position and a second position, receiving an impact in the first position, moving to a second position upon impact, and absorbing and distributing the force of the impact in the second position.

Another embodiment of the present disclosure relates to a mining shovel. The mining shovel includes a boom, a frame, and a mounting bracket assembly coupled to the mining shovel frame and adjacent to the boom. The mining shovel also includes at least one support leg rotatably coupled to the mounting bracket assembly, and an impact plate assembly coupled to the support leg and disposed adjacent to the crowd machinery.

In this embodiment, the impact plate assembly includes an impact plate configured to receive impacts from a dipper assembly, at least one support leg bracket coupled to the impact plate and configured to receive the support leg, and at least one cushion subassembly coupled to the impact plate assembly, the cushion subassembly including a dampening portion. The impact plate assembly is configured to move between a first position and a second position, receiving an impact in the first position, moving to a second position upon impact, and absorbing and distributing the force of the impact in the second position.

Another embodiment of the present disclosure relates to a crowd machinery guard. The crowd machinery guard includes an impact plate, and at least one cushion subassembly coupled to the impact plate, the cushion subassembly including a dampening portion. The crowd machinery guard is configured to receive impacts from a mining shovel dipper assembly, absorbing and distributing the forces of the impact.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
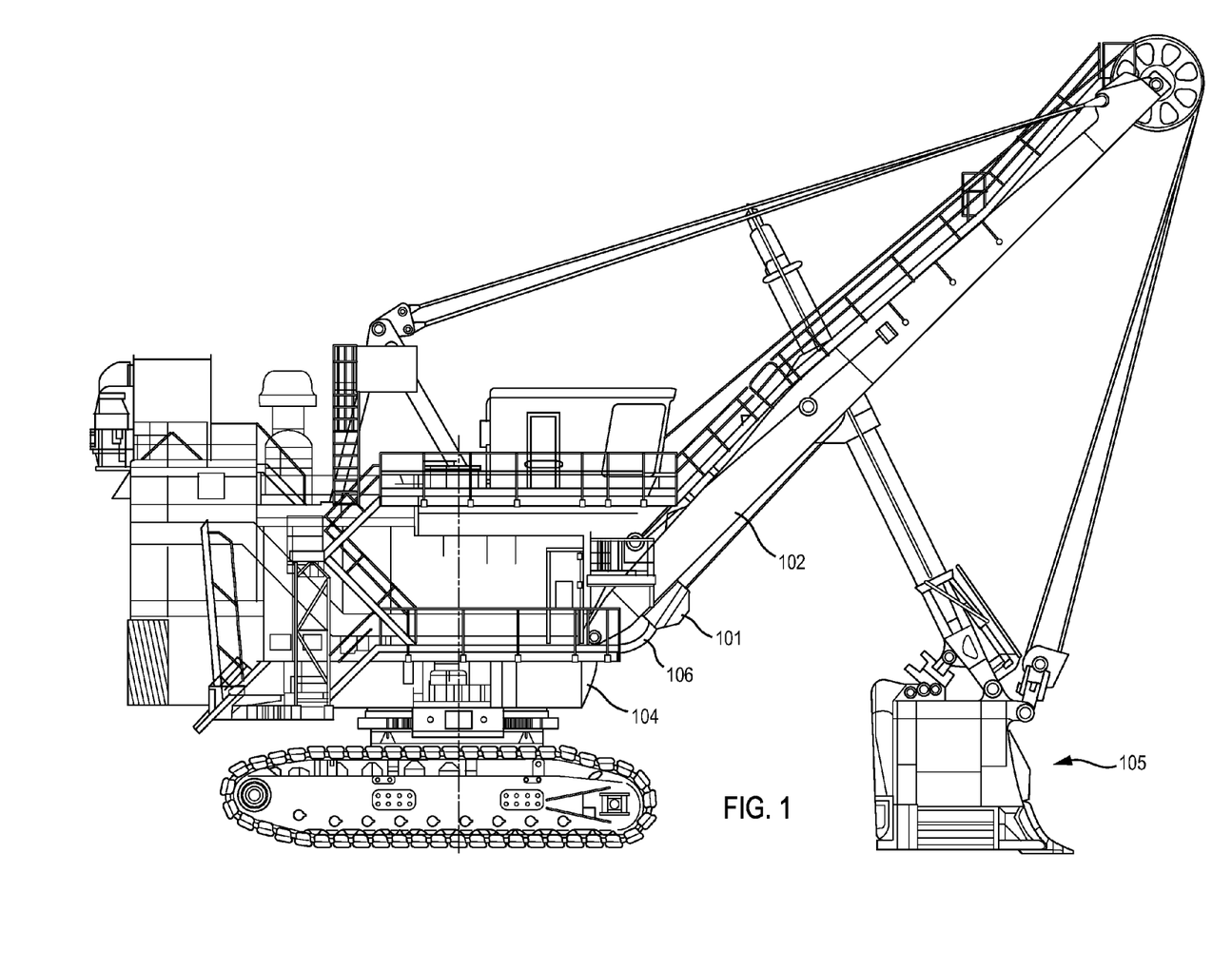
FIG. 1 is a side view of a mining shovel with a conventional bumper.

Referring to FIG. 1, a side view of a mining shovel is shown. A conventional bumper 101 is also shown attached to the mining shovel, and partially covering the crowd machinery 106. In this configuration, the conventional bumper 101 is attached to the boom 102 and protects the crowd machinery 106 from certain impacts by the dipper assembly 105. The mining shovel shown in FIG. 1 is for illustrative purposes only, and is not necessarily typical of the mining shovels associated with the crowd machinery guard of the present disclosure.

Figure 2:
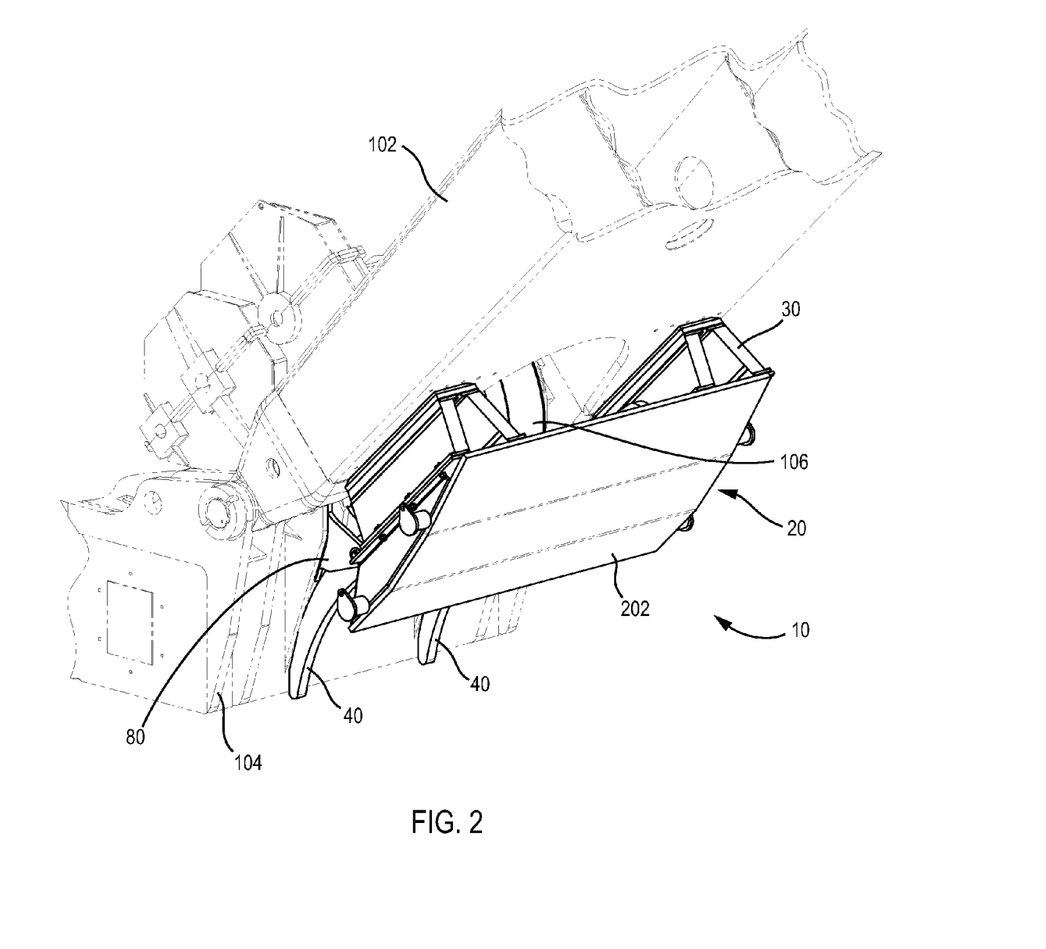
FIG. 2 is a view of a crowd machinery guard attached to the front of a mining shovel, according to an exemplary embodiment.

Referring now to FIG. 2, a crowd machinery guard 10 of the present disclosure is shown, according to an exemplary embodiment. The crowd machinery guard 10 shields the crowd machinery 106 and the surrounding area on the mining shovel from impacts by the dipper assembly 105. In this embodiment, the crowd machinery guard 10 includes a mounting bracket assembly 80, positioned just beneath the crowd machinery 106 and the boom 102. The mounting bracket assembly 80 mounts the crowd machinery guard 10 to the revolving frame 104. The mounting bracket assembly 80 is welded to the frame 104, but may be connected to the frame 104 by connecting hardware or any other method.

The mounting bracket assembly 80 is connected to support legs 40 that extend up and away from the mounting bracket assembly 80. In this embodiment, the support legs 40 are curved at one end to approximate the angle of the revolving frame 104 and the boom 102. However, the legs 40 may be of another shape suitable for supporting the impact plate assembly 20. The legs 40 are rotatably pinned at the base of the non-curved portion to the mounting bracket assembly 80. The support legs 40 connect the remaining components of the crowd machinery guard 10 to the mounting bracket assembly 80.

The non-curved portions of the support legs 40 are connected to an impact plate assembly 20, including a large impact plate 202 that receives impacts from the dipper assembly 105. As the dipper assembly 105 strikes the impact plate 202, the impact plate assembly 20 rotates along with the support legs 40 toward the boom 102. Cushion subassemblies 30 located on the back of the impact plate assembly 20 absorb the force of this rotation, distributing the force through the bumper guard 10 and away from the crowd machinery 106. In addition, the movement of the impact plate assembly 20 from its resting position, upward and against gravity, may absorb some of the force of the impact. The cushion subassemblies 30 are made from an elastomer in exemplary embodiments, but can utilize springs or other dampening or shock-absorbing material.

Figure 3:
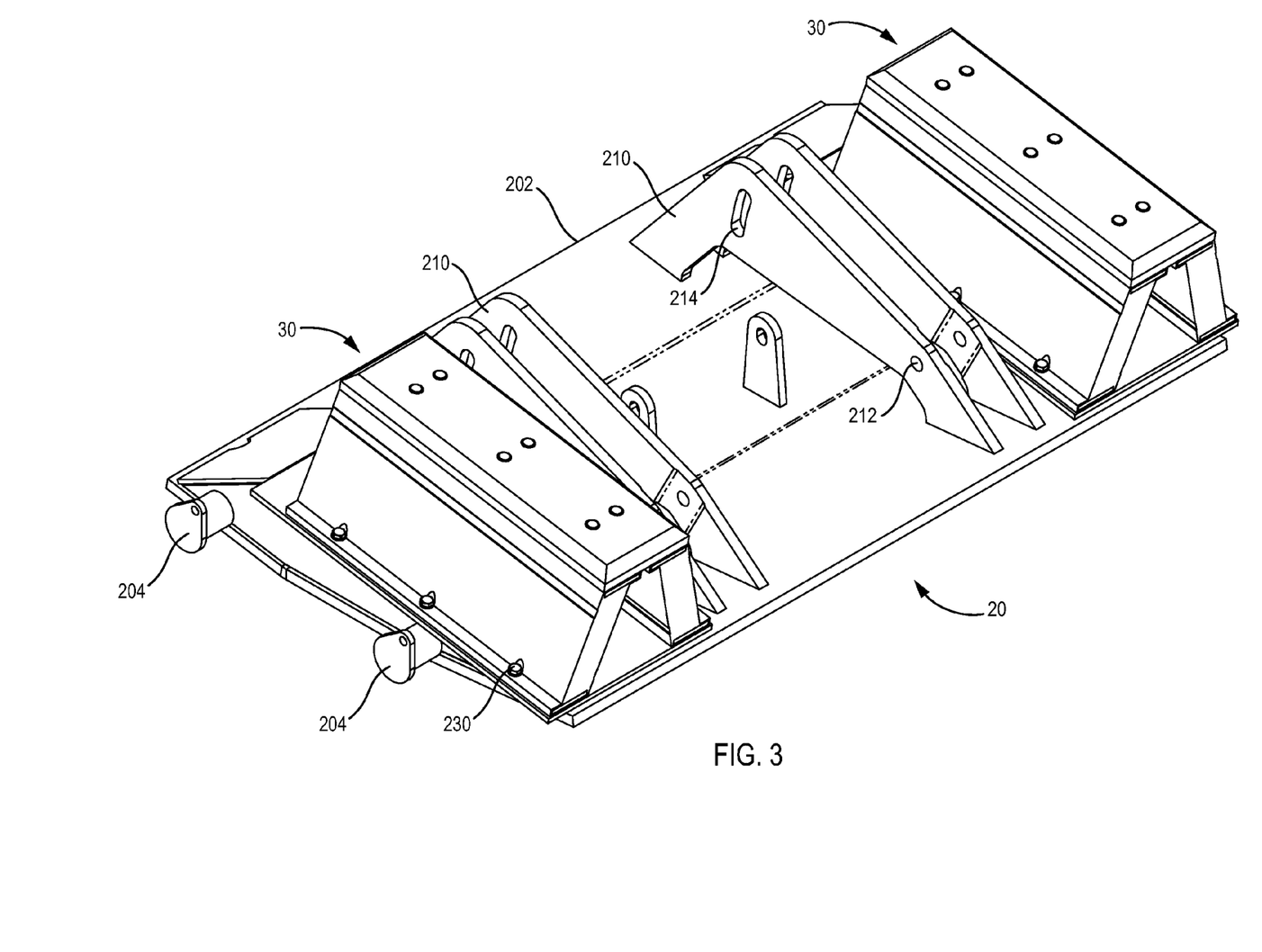
FIG. 3 is an isolated back view of the impact plate assembly of the crowd machinery guard, according to an exemplary embodiment.

Referring now to FIG. 3, a back view of the impact plate assembly 20 is shown, according to an exemplary embodiment. The impact plate assembly 20 includes an impact plate 202 that faces outward on the mining shovel and receives impacts from the dipper assembly 105. According to an exemplary embodiment shown in FIG. 2, the impact plate 202 is rectangular in shape, with two outer portions angled up toward a flat middle portion. In this embodiment, the impact plate 202 is approximately 160 inches across and approximately 90 inches in height, but may be of any size suitable for use in an intended application or for a particular shovel. In this embodiment, the impact plate 202 is made from steel and weighs approximately 6 tons. However, it should be noted that the impact plate 202 may be of any shape that provides coverage for the crowd machinery 106, and the impact plate 202 may be made from any material configured to withstand impacts from the dipper assembly 105.

The impact plate assembly 20 also includes support leg brackets 210. The support leg brackets 210 are located on the back of the impact plate 202 and connect the impact plate assembly 20 to the support legs 40 (see FIG. 5). In one exemplary embodiment, the impact plate assembly 20 includes four support leg brackets 210. Two brackets 210 are positioned on one side of the impact plate assembly 20 and two brackets 210 are positioned on the opposite side of the impact plate assembly 20. Each set of two brackets 210 is configured to receive a support leg 40. Holes 212 and slots 214 line up with bushing 402 and opening 404 (see FIG. 5), respectively, on the support legs 40, and each support leg 40 is coupled to the support leg brackets 210 by pin assemblies 60 and 70 (see FIGS. 7-8).

The impact plate assembly 20 also includes lifting lugs 204. The lifting lugs 204 provide a lifting point for the crowd machinery guard 10, so that the guard 10 can be lifted and coupled to the mounting bracket assembly 80.

The impact plate assembly 20 also includes at least one cushion subassembly 30. The cushion subassembly 30 may include an elastomer cushion in exemplary embodiments. However, the cushion subassembly 30 may also utilize springs or other dampening materials in other embodiments to absorb the impact of the dipper assembly 105.

Figure 4:
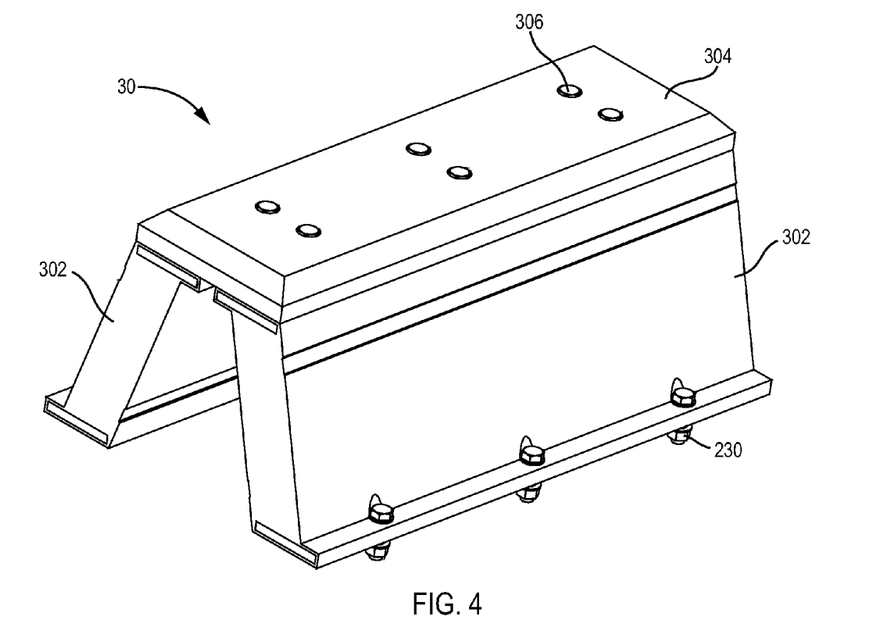
FIG. 4 is an isolated view of a cushion subassembly, according to an exemplary embodiment.

The cushion subassembly 30 is coupled to the back of the impact plate 202 by cushion pin assemblies 230. An isolated view of a cushion subassembly 30 is shown in FIG. 4, according to an exemplary embodiment. In the illustrated embodiment of FIG. 4, the cushion subassembly 30 includes two bumper fenders 302 (e.g., legs, etc.) connected to a bumper shield 304 (e.g., face, etc.). The bumper fenders 302 extend at an angle, away from the impact plate 202 and to the bumper shield 304, forming a V-shape. The bumper fenders 302 are coupled to the bumper shield 304 by locking assemblies 306. In this embodiment, each locking assembly 306 includes a screw (not shown) pushed through the bumper shield 304 and a portion of the fender 302, and a washer (not shown) and nut (not shown) configured to fit over the screw to connect and lock the bumper shield 304 to the bumper fender 302. However, this cushion subassembly 30 may be connected by any other suitable method.

Figures 10, 11:
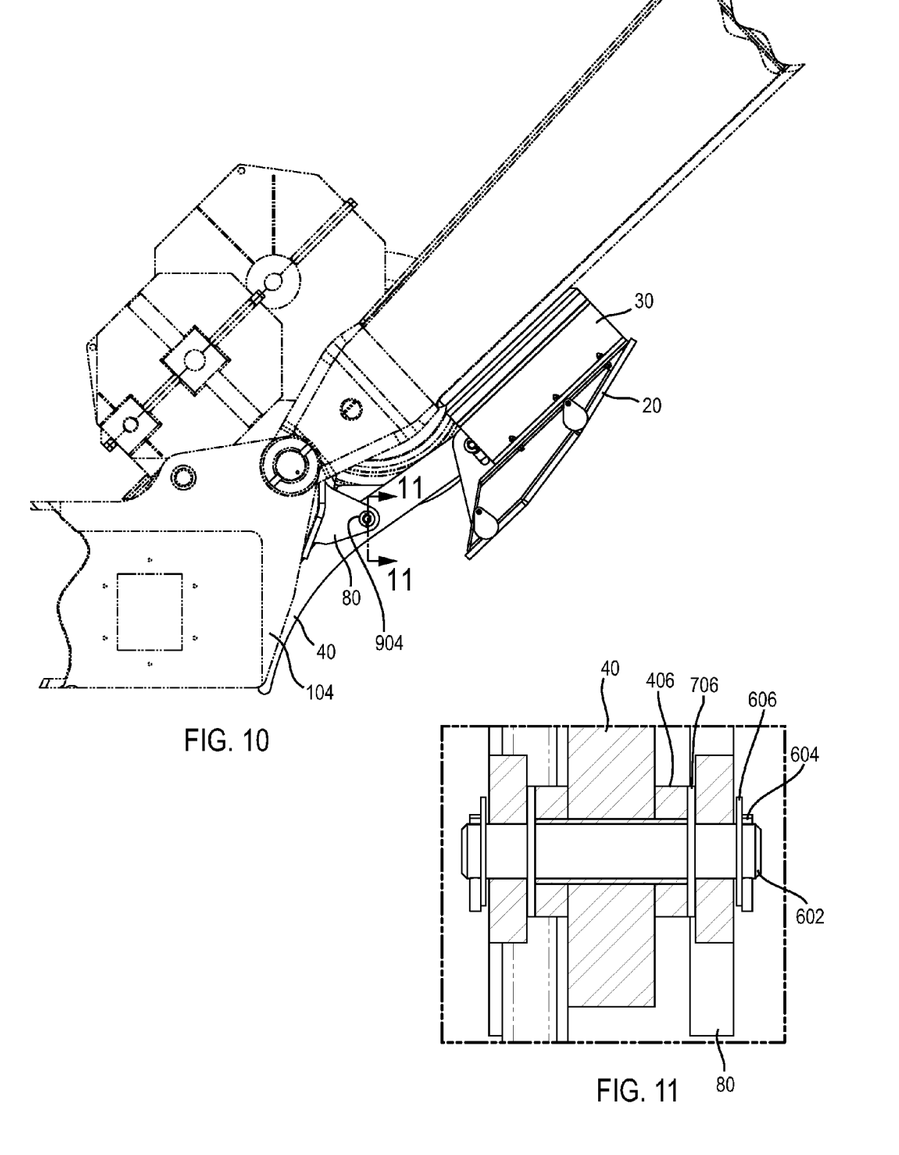
FIG. 10 is a side view of the crowd machinery guard identified in FIG. 2, according to an exemplary embodiment.
FIG. 11 is a cross-section of the mounting bracket assembly to support leg connection shown at 11-11 in FIG. 10.

When the dipper assembly 105 strikes the impact plate 202, the crowd machinery guard 10 is rotated around the pinned connection 904 (shown in FIGS. 10-11). The impact plate assembly 20 is driven backwards toward the boom 102 until it makes contact with the boom 102. The support legs 40 also rotate with the impact plate assembly 20, lifting up from their resting point on the frame 104. Once impacted, the cushion subassemblies 30 act as dampeners, absorbing the forces incurred by repeated collisions with the dipper assembly 105. In exemplary embodiments, the bumper fenders 302 and bumper shield 304 are made from an elastomer or other type of rubber suitable for compressibly absorbing impact. However, the cushion subassembly 30 may also utilize springs or other dampening materials in other embodiments to absorb the impact of the dipper assembly 105.

Figure 5:
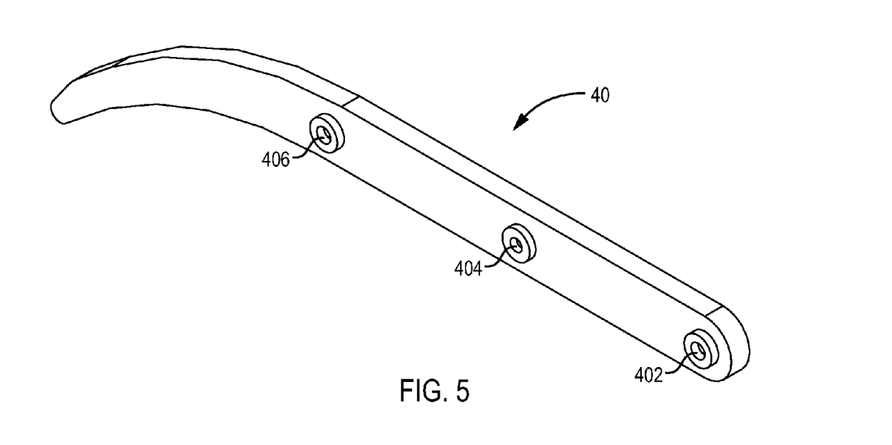
FIG. 5 is an isolated view of a support leg, according to an exemplary embodiment.

An isolated view of a support leg 40 is shown in FIG. 5, according to an exemplary embodiment. In this embodiment, the support leg 40 is curved to approximate the angle created by the connection between the revolving frame 104 and the boom 102. The support legs 40 are coupled to the impact plate assembly 20 at a first end and coupled to the mounting bracket assembly 80 at a point near the center of the support legs 40. A second end of the support legs 40 rests against the frame 104 in the crowd machinery guard 10 resting position. The support legs 40 support the crowd machinery guard 10 and position the impact plate assembly 20 in front of the crowd machinery 106. When the impact plate assembly 20 receives an impact, the support legs 40 rotate around the pinned connection 904, allowing the impact plate assembly 20 to be driven backwards toward the boom 102. As the impact plate assembly 20 is driven toward the boom 102 and the cushion subassemblies 30 absorb the impact and the support legs 40 lift up from the frame 104. The weight of the impact plate assembly 20 may also absorb a portion of the force of the impact, as the dipper assembly 105 pushes the impact plate assembly 20 upward and against gravity.

The bushings 402 and 406 facilitate connections to the impact plate assembly 20 and the mounting bracket assembly 80. Bushing 402 and opening 404 line up with hole 212 and slot 214, respectively, on the impact plate assembly 20, and are coupled with pin assemblies 60 and 70. Bushing 406 lines up with hole 804 (shown in FIG. 9) on the mounting bracket assembly 80, and the support leg 40 is rotatably coupled to the mounting bracket assembly 80 by a pinned connection 904. When impacted, the support legs 40 rotate from a first position to a second position around the pinned connection 904.

Figure 6:
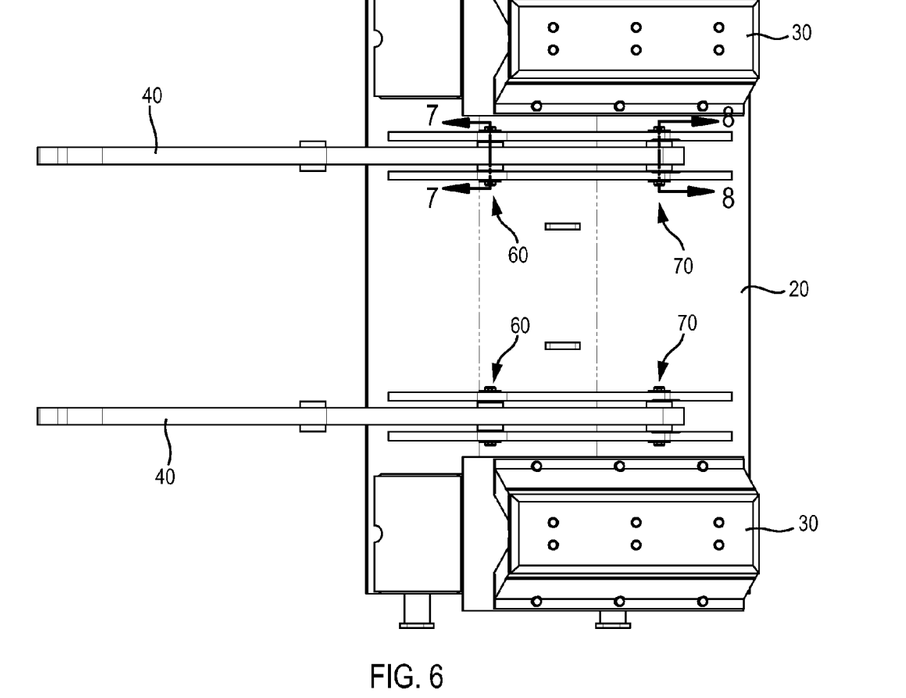
FIG. 6 is a back view of the impact plate assembly with attached support legs, according to an exemplary embodiment.

Referring now to FIG. 6, the back of the impact plate assembly 20 is shown, including the connected cushion subassemblies 30, according to an exemplary embodiment. The support legs 40 are also shown in the illustrated embodiment of FIG. 6. In this embodiment, each cushion subassembly 30 is connected to the impact plate 202 by six cushion pin assemblies 230. In exemplary embodiments, each pin assembly 230 includes a screw, two washers, and a nut. However, the cushion subassembly 30 can be connected to the impact plate assembly 20 by any suitable method of connection. The support legs 40 are each connected at two attachment points by pin assemblies 60 and 70, which are shown in detail in FIGS. 7 and 8.

Figure 7:
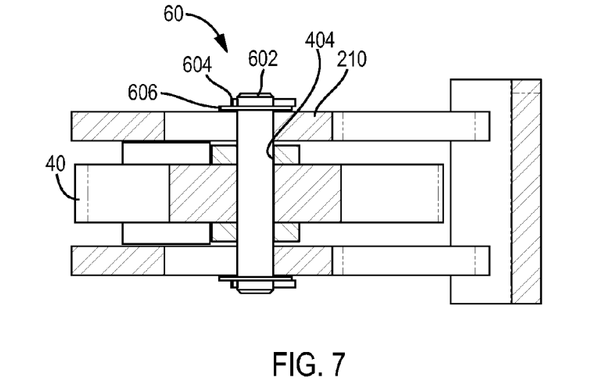
FIG. 7 is a cross-section of the impact plate assembly to support leg connection shown at 7-7 in FIG. 6.
Figure 8:
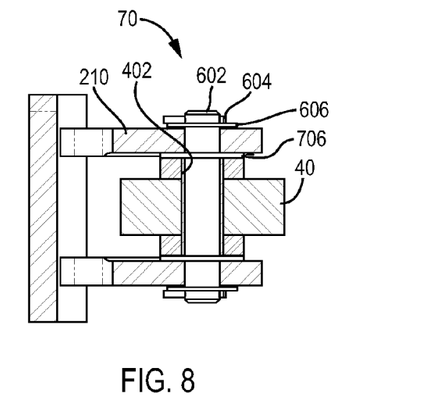
FIG. 8 is a cross-section of the impact plate assembly to support leg connection shown at 8-8 in FIG. 6.

FIGS. 7 and 8 are cross-section views of the pin assemblies 60 and 70 identified in FIG. 6. Pin assembly 60 includes an attaching pin 602, washers 606, and locking pins 604. According to an exemplary embodiment, attaching pin 602 is cylinder-shaped with a length of 13.75 inches and a diameter of 2.5 inches, and locking pin 604 is cylinder-shaped with a length of 4.5 inches and a diameter of 0.5 inches. However, attaching pin 602, washers 606, and locking pins 604 may be of any size suitable for the application.

Pin assemblies 60 and 70 couple the support legs 40 to the impact plate assembly 20. According to an exemplary embodiment, attaching pin 602 is positioned through slot 214 on the support leg brackets 210 and through opening 404 on the support leg 40. Washers 606 are positioned on either side of the support leg brackets 210 over the attaching pin 602, and the attaching pin 602 and washers 606 are locked into place by locking pins 604. The locking pins 604 are positioned on both ends of the attaching pin 602, locking pin assembly 60 into place. In other embodiments, pin assembly 60 may include any other connecting hardware suitable for coupling the support legs 40 to the impact plate assembly 20.

In pin assembly 70, attaching pin 602 is positioned through hole 212 on the support leg brackets 210 and through bushing 402 on the support leg 40. Washers 606 are positioned over the attaching pin 602 on both sides of the support leg brackets 210, and thrust washers 706 are positioned over the attaching pin 602 on the inside of the support leg brackets 210 between the brackets 210 and the bushings 402. Thrust washers 706 may be actual thrust washers in exemplary embodiments, but may be any washer as is suitable for the application in other embodiments. The attaching pin 602 and washers 606 and 706 are locked into place by locking pins 604. The locking pins 604 are positioned on both ends of the attaching pin 602, locking pin assembly 70 into place. However, attaching pin 602, washers 606 and 706, and locking pins 604 may be of any size suitable for the application. Also, pin assembly 70 may include any other connecting hardware suitable for coupling the support legs 40 to the impact plate assembly 20.

Figure 9:
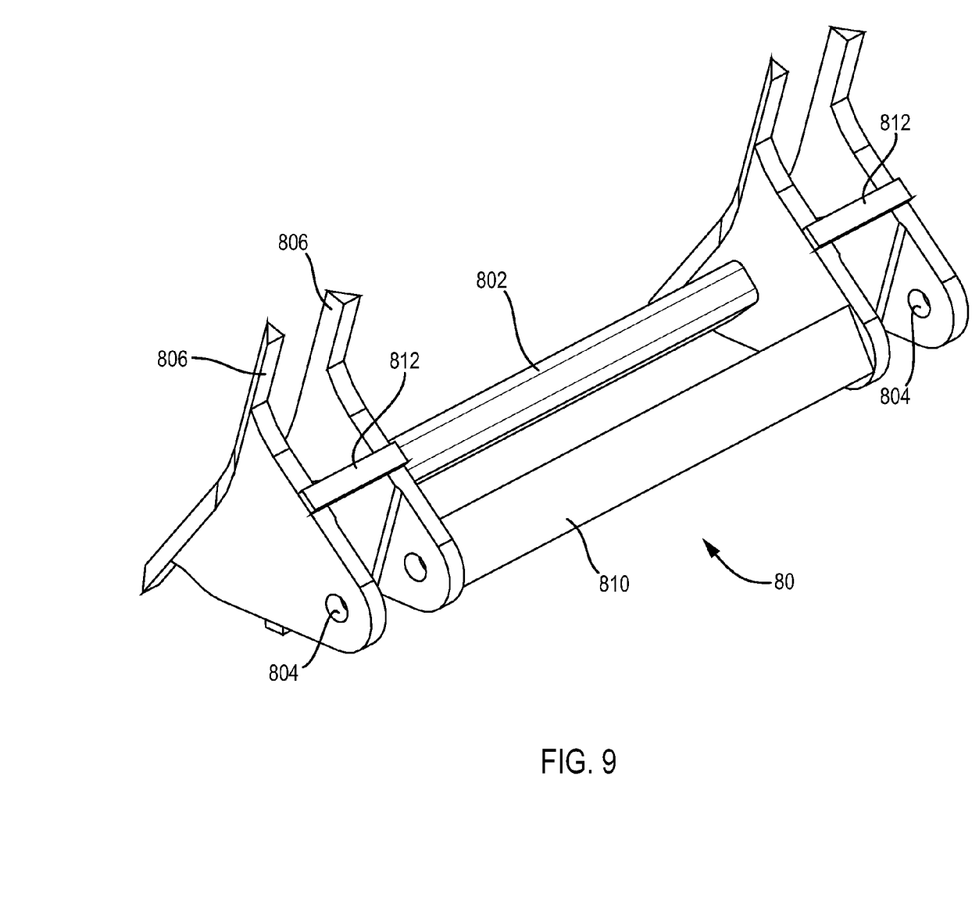
FIG. 9 is an isolated view of a mounting bracket assembly for connecting the impact plate assembly to the shovel frame, according to an exemplary embodiment.

Referring now to FIG. 9, an isolated view of the mounting bracket assembly 80 is shown. The mounting bracket assembly 80 is coupled to the revolving frame 104, and provides a mounting point for the rest of the crowd machinery guard 10. According to an exemplary embodiment, the mounting bracket assembly 80 includes a rectangular support brace 802 that serves as a permanent brace for the assembly 80. In this embodiment, the mounting bracket assembly 80 also includes an angle brace 810 and tabular braces 812. These braces 810 and 812 hold the mounting bracket assembly 80 together before the assembly 80 is positioned on the revolving frame 104, but are removed once the assembly 80 is connected to the frame 104. According to an exemplary embodiment, the mounting bracket assembly 80 is coupled to the frame 104 at the connecting tabs 806. However, the mounting bracket assembly 80 may be connected to the frame 104 by locking hardware or any other method of connection in other embodiments.

In FIG. 10, a side view of the crowd machinery guard 10 attached to the frame 104 is shown. The support legs 40 are attached to the mounting bracket assembly 80 by a pinned connection 904. The pinned connection 904 rotatably couples the rest of the crowd machinery guard 10 to the mounting bracket assembly 80. The impact plate assembly 20 rotates from a first position to a second position around this pinned connection 904 when impacted by the dipper assembly 105. When the impact plate assembly 20 receives an impact, the support legs 40 rotate around the pinned connection 904, allowing the impact plate assembly 20 to be driven backwards toward the boom 102. As the impact plate assembly 20 is driven toward the boom 102 and the cushion subassemblies 30 absorb the impact, the support legs 40 lift up from the frame 104.

Referring now to FIG. 11, a cross-section of the pinned connection 904 identified in FIG. 10 is shown, in the 11-11 direction. Each pinned connection 904 includes an attaching pin 602 positioned within the mounting bracket holes 804 and through the bushing 406 of the support leg 40. The attaching pin 602 is supported by washers 606 and 706 and locked into place by a locking pin 604. According to an exemplary embodiment, attaching pin 602 is cylinder-shaped with a length of 13.75 inches and a diameter of 2.5 inches, and locking pin 604 is cylinder-shaped with a length of 4.5 inches and a diameter of 0.5 inches. However, the hardware associated with the pinned connection 904 may be of any size suitable for the connection.

Figure 12:
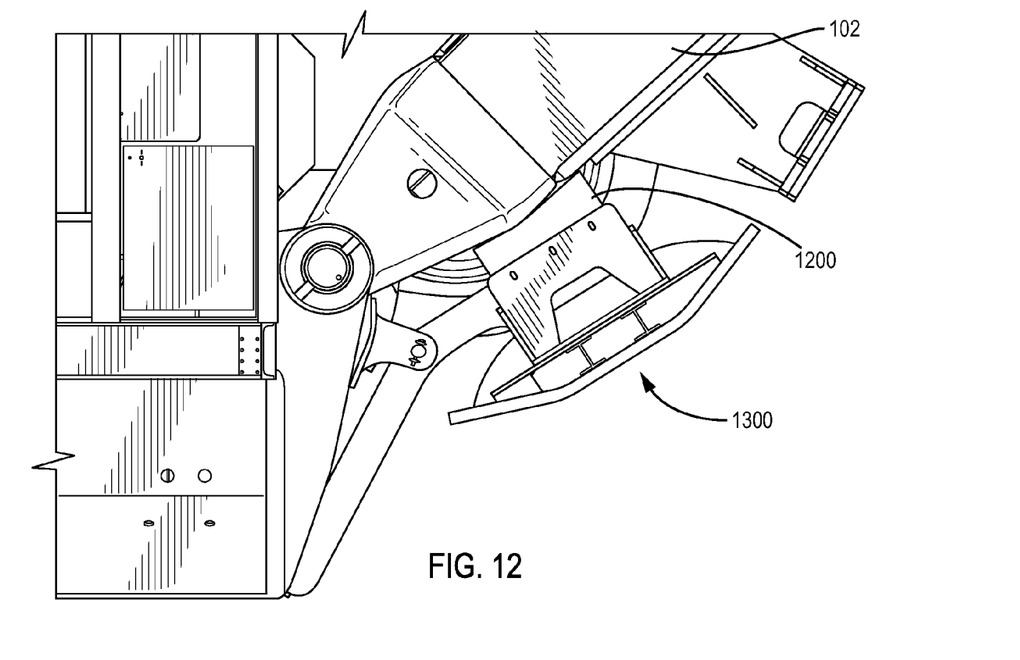
FIG. 12 is a side view of a crowd machinery guard, according to an alternative embodiment.
Figure 13:
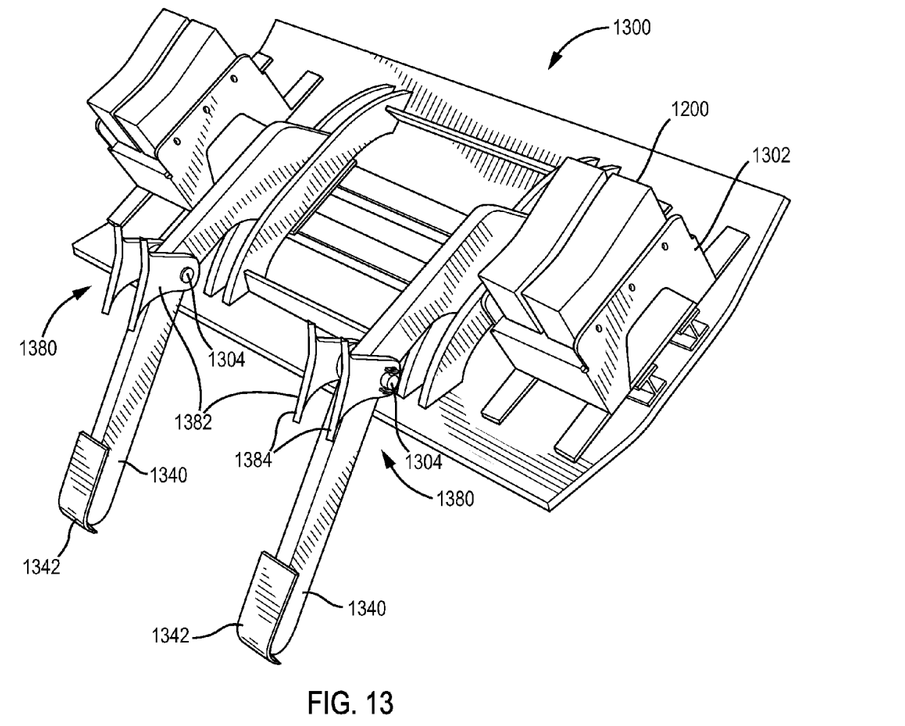
FIG. 13 is an isolated back view of a crowd machinery guard, according to an alternative embodiment.

Referring now to FIGS. 12-13, a crowd machinery guard is shown, according to an alternative embodiment. In this embodiment, the cushion subassemblies 1200 are shown as single-piece cushions. The cushion subassemblies 1200 are made from an elastomer or some other type of rubber and are configured to absorb the impact from the dipper assembly 105. The cushion subassemblies 1200 are disposed within a cushion housing 1302 on the back of the impact plate assembly 1300 (shown in FIG. 13). The cushion subassemblies 1200 are curved to approximately match the curvature of the boom 102 in this embodiment.

FIG. 13 shows a back view of a crowd machinery guard, according to an alternative embodiment. In this embodiment, the impact plate assembly 1300 includes a cushion housing 1302 for the cushion subassemblies 30. The cushion subassemblies 30 are disposed inside the housing 1302 and coupled to the impact plate assembly 1300 by pin assemblies (not shown). The pin assemblies can be of any type suitable to couple the cushion subassemblies 1200 to the cushion housings 1302.

Also in this alternative embodiment, the mounting bracket assembly 1380 includes two separate mounting brackets 1382. The brackets 1382 are attached separately to the revolving frame 104 at their connecting tabs 1384. The brackets 1382 are coupled to the support legs 1340 by a pinned connection 1304, as in the exemplary embodiment of FIGS. 10-11. The support legs 1340 include resting pads 1342 to cushion the support legs 1340 as they make impact with the frame 104.

Figure 14:
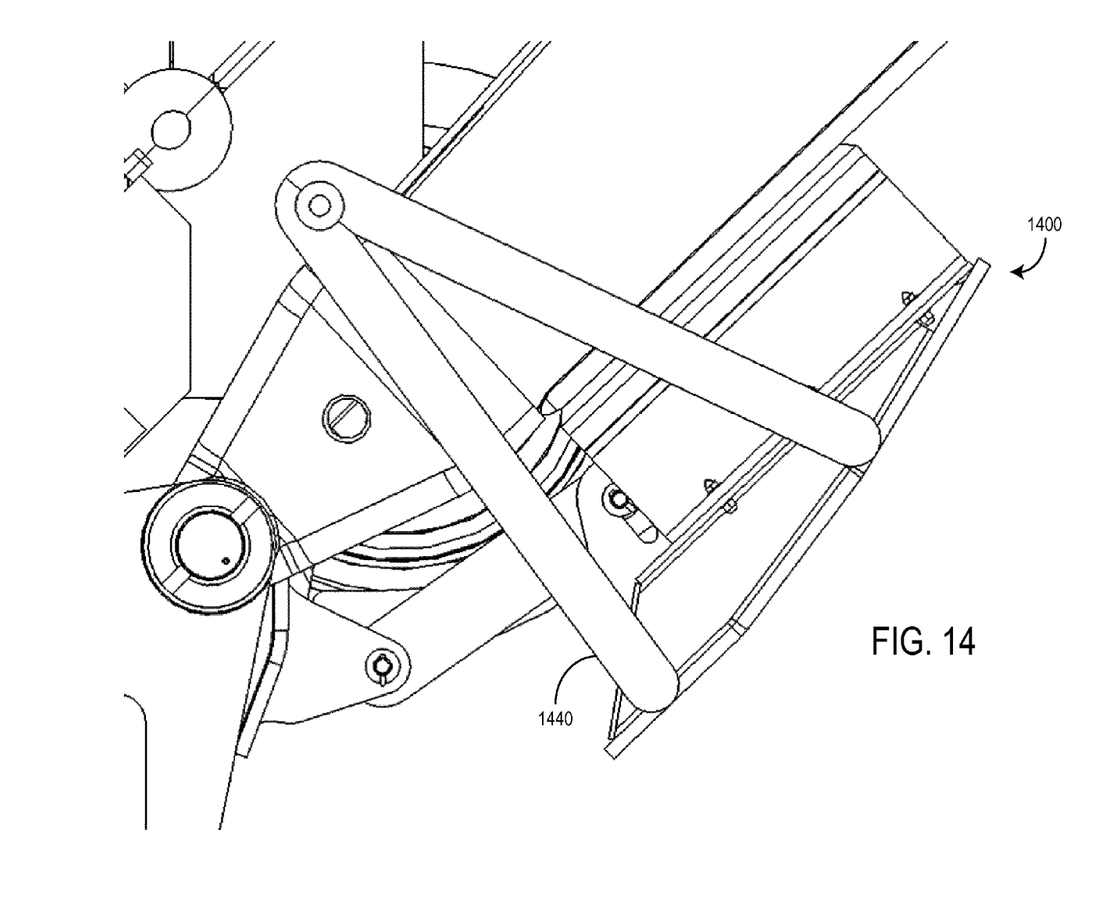
FIG. 14 is a side view of a crowd machinery guard, according to an alternative embodiment.

Referring now to FIG. 14, a crowd machinery guard is shown, according to an alternative embodiment. In this embodiment, the crowd machinery guard 1400 attaches to the boom 102, rather than having support legs that rest against the frame 104. The crowd machinery guard 1400 includes support arms 1440 that attach to the boom 102, maintaining the position of the guard 1400 over the crowd machinery 106. In this embodiment, the support arms 1440 may attach to the boom 102 by any method, including a pinned connection, a locking assembly, or any other method suitable for the application. The crowd machinery guard 1400 serves a similar function in this embodiment, resting in front of the crowd machinery 106, and protecting the machinery 106 from impacts by the dipper assembly 105.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for providing the crowd machinery guard as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

INDUSTRIAL APPLICABILITY

The disclosed crowd machinery guard may be implemented into any large machine with exposed components that are subject to impacts. The disclosed crowd machinery guard may help reduce crowd machinery repair and maintenance costs due to impacts from the dipper components. The disclosed crowd machinery guard may help reduce damage to the crowd machinery that typically occurs from direct collision with dipper components. The disclosed crowd machinery guard may also reduce typical bumper repair and assembly costs by providing a crowd machinery guard with replaceable parts. The disclosed crowd machinery guard is made up of multiple assemblies, connected by pins and bolts and removable and replaceable with simple tools.

It will be apparent to those skilled in the art that various modifications and variations can be made to the disclosed crowd machinery guard. Other embodiments will be apparent to those skilled in the art from consideration of the specification and practice of the disclosed crowd machinery guard. It is intended that the specification and examples be considered as exemplary only, with a true scope being indicated by the following claims and their equivalents.

What is claimed is:

1. A crowd machinery guard system for a mining shovel, comprising:

a mounting bracket assembly coupled to the front of the mining shovel frame;

at least one support leg rotatably coupled to the mounting bracket assembly;

an impact plate assembly coupled to the support leg and disposed adjacent to the crowd machinery, the impact plate assembly comprising:

an impact plate configured to receive impacts from a dipper assembly;

at least one support leg bracket coupled to the impact plate and configured to receive the support leg;

at least one cushion subassembly coupled to the impact plate, the cushion subassembly including a dampening portion; and wherein the crowd machinery guard system is configured to move between a first position and a second position, receiving an impact in the first position, moving to a second position upon impact, and absorbing and distributing the force of the impact in the second position.

2. The crowd machinery guard system of claim 1, wherein the crowd machinery guard system includes at least two support legs.

3. The crowd machinery guard system of claim 2, wherein the support legs have a curvature, the curvature configured to approximate the angle created by the connection between the mining shovel revolving frame and the boom.

4. The crowd machinery guard system of claim 1, wherein the crowd machinery guard includes at least two cushion subassemblies.

5. The crowd machinery guard of claim 4, wherein the cushion subassembly includes two bumper fenders, a first end of both bumper fenders extending toward and coupled to a bumper shield, a second end of both bumper fenders coupled to the impact plate assembly.

6. The crowd machinery guard system of claim 5, wherein the bumper fenders are angled toward each other as they extend to the bumper shield, the bumper fenders forming a V-shape within the cushion subassembly.

7. The crowd machinery guard of claim 4, wherein the cushion subassemblies include a single elastomer cushion, the cushion curved to approximate the angle of the mining shovel boom.

8. The crowd machinery guard system of claim 1, wherein one or more support legs are configured to rotate from a first support leg position to a second support leg position upon receiving an impact.

9. The crowd machinery guard of claim 1, wherein the mounting bracket assembly includes two brackets coupled by a perpendicular support bar and configured to receive support legs.

10. A mining shovel, comprising:

a boom;

a frame;

a mounting bracket assembly coupled to the mining shovel frame and adjacent to the boom;

at least one support leg rotatably coupled to the mounting bracket assembly;

an impact plate assembly coupled to the support leg and disposed adjacent to the crowd machinery, the impact plate assembly comprising:

an impact plate configured to receive impacts from a dipper assembly;

at least one support leg bracket coupled to the impact plate and configured to receive the support leg;

at least one cushion subassembly coupled to the impact plate assembly, the cushion subassembly including a dampening portion; and wherein the impact plate assembly is configured to move between a first position and a second position, receiving an impact in the first position, moving to a second position upon impact, and absorbing and distributing the force of the impact in the second position.

11. The mining shovel of claim 10, wherein the at least one support leg has a curvature, the curvature configured to approximate the angle created by the connection between the mining shovel revolving frame and the boom.

12. The mining shovel of claim 10, wherein wherein one or more support legs are configured to rotate from a first support leg position to a second support leg position upon receiving an impact.

13. The mining shovel of claim 10, wherein the cushion subassembly includes two bumper fenders, a first end of both bumper fenders extending toward and coupled to a bumper shield, a second end of both bumper fenders coupled to the impact plate assembly.

14. The mining shovel of claim 13, wherein the bumper fenders are angled toward each other as they extend to the bumper shield, the bumper fenders forming a V-shape within the cushion subassembly.

15. The mining shovel of claim 10, wherein the cushion subassemblies include a single elastomer cushion, the cushion curved to approximate the angle of the mining shovel boom.

* * * * *